US011091170B2

(12) United States Patent
Hashimoto (10) Patent No.: US 11,091,170 B2
(45) Date of Patent: Aug. 17, 2021

(54) AUTONOMOUS DRIVING SYSTEM (71) Applicant: TOYOTA JIDOSHA KABUSHIKI KAISHA, Toyota (JP)

(72) Inventor: Ryuta Hashimoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 16/175,966

(22) Filed: Oct. 31, 2018

(65) Prior Publication Data

US 2019/0202471 A1    Jul. 4, 2019

(30) Foreign Application Priority Data

Dec. 28, 2017   (JP) .............................. JP2017-253853

(51) Int. Cl.
*B60W 50/08* (2020.01)
*B60W 40/08* (2012.01)
*G05D 1/00* (2006.01)
*B60W 50/14* (2020.01)

(52) U.S. Cl.
CPC .......... *B60W 50/085* (2013.01); *B60W 50/14* (2013.01); *G05D 1/0055* (2013.01); *G05D 1/0088* (2013.01); *B60W 2050/143* (2013.01); *G05D 2201/0213* (2013.01)

(58) Field of Classification Search
CPC ....... B60W 50/08; B60W 40/08; G08B 21/04; G09G 5/00; G01S 13/93; G05D 1/00; G05D 1/02
See application file for complete search history.

(56) References Cited

U.S. PATENT DOCUMENTS

| | | | |
|---|---|---|---|
| 10,083,547 B1* | 9/2018 | Tomatsu | G02B 27/01 |
| 10,459,080 B1* | 10/2019 | Schwesig | G06F 21/6245 |
| 2014/0300479 A1* | 10/2014 | Wolter | G08B 21/06 340/576 |
| 2017/0021837 A1* | 1/2017 | Ebina | B60W 50/082 |
| 2017/0261983 A1* | 9/2017 | Abe | G05D 1/0088 |
| 2018/0095477 A1* | 4/2018 | Borngraber | B60W 50/00 |
| 2018/0231976 A1* | 8/2018 | Singh | B60W 30/12 |

FOREIGN PATENT DOCUMENTS

| | | |
|---|---|---|
| JP | 2013-544695 A | 12/2013 |
| WO | 2012/047743 A2 | 4/2012 |

* cited by examiner

*Primary Examiner* — Yuri Kan
(74) *Attorney, Agent, or Firm* — Sughrue Mion, PLLC (57) ABSTRACT

An autonomous driving system issues an operation instruction to a driver of a vehicle during autonomous driving. The operation instruction is an instruction that makes a request or a proposal to the driver and urges the driver to perform a response operation responding to the request or the proposal. An attention desire degree is a degree of the driver's desire to pay attention to a situation surrounding the vehicle, and an attention event is an event that increases the attention desire degree. A delay condition is that the attention desire degree exceeds a threshold or the attention event exists. When the operation instruction is necessary and the delay condition is satisfied, the autonomous driving system performs delay processing that waits without issuing the operation instruction. When a delay end condition is satisfied after start of the delay processing, the autonomous driving system issues the operation instruction.

7 Claims, 12 Drawing Sheets

<EXAMPLES OF ATTENTION EVENT>

| | |
|---|---|
| RELATIONSHIP WITH SURROUNDING VEHICLE | INTER-VEHICLE DISTANCE TO SURROUNDING VEHICLE IS LESS THAN THRESHOLD |
| | TTC WITH SURROUNDING VEHICLE IS LESS THAN THRESHOLD |
| | CUTTING-IN VEHICLE |
| VEHICLE STATE | DECELERATION IS THRESHOLD OR HIGHER |
| | IN MIDDLE OF AVOIDING ACTION FOR AVOIDING OBSTACLE |
| TERRAIN | DISTANCE TO LANE TERMINATION POINT IS LESS THAN THRESHOLD |
| | DISTANCE TO LANE MERGING POINT IS LESS THAN THRESHOLD |

AUTONOMOUS DRIVING SYSTEM

BACKGROUND

Technical Field

The present disclosure relates to an autonomous driving system that controls autonomous driving of a vehicle. In particular, the present disclosure relates to an autonomous driving system that issues an operation instruction to a driver during autonomous driving.

Background Art

Patent Literature 1 discloses an autonomous driving system. The autonomous driving system detects a zone where autonomous driving is difficult such as a lane merging section and a zone under construction. When a vehicle approaches such the autonomous driving difficult zone, the autonomous driving system requests a driver to perform control such as steering, accelerating, and decelerating.

LIST OF RELATED ART

Patent Literature 1: Japanese Translation of PCT International Application Publication No. JP-2013-544695

SUMMARY

An autonomous driving system sometimes issues an "operation instruction" to a driver during autonomous driving, as exemplified in the above-mentioned Patent Literature 1. The operation instruction is an instruction that makes a request or a proposal to a driver and urges the driver to perform a "response operation" responding to the request or the proposal, In some cases, the autonomous driving system issues the operation instruction at a timing when the driver desires to pay attention to a surrounding situation. When the autonomous driving system issues the operation instruction, the driver needs to understand a content of the operation instruction and further perform the response operation. However, there is a limit to the amount of information and the number of operations that a human (driver) can handle simultaneously. Therefore, if the operation instruction is issued at a timing when the driver desires to pay attention to the surrounding situation, the driver is likely to feel senses of urgency and discomfort. It is also likely that the driver having no room to breathe cannot perform the response operation accurately. These hinder a smooth vehicle travel and decrease confidence in the autonomous driving system.

An object of the present disclosure is to provide a technique that can suppress the driver's senses of urgency and discomfort in the autonomous driving system that issues the operation instruction to the driver during the autonomous driving.

A first disclosure is directed to an autonomous driving system mounted on a vehicle.

The autonomous driving system includes:

an information acquisition device configured to acquire driving environment information indicating driving environment for the vehicle; and a control device configured to control autonomous driving of the vehicle based on the driving environment information and to issue an operation instruction to a driver of the vehicle during the autonomous driving.

The operation instruction is an instruction that makes a request or a proposal to the driver and urges the driver to perform a response operation responding to the request or the proposal.

An attention desire degree is a degree of the driver's desire to pay attention to a situation surrounding the vehicle.

An attention event is an event that increases the attention desire degree and is recognized based on the driving environment information.

A delay condition is that the attention desire degree exceeds a threshold or the attention event exists.

The control device is further configured to:

determine, based on the driving environment information, whether or not the delay condition is satisfied when the operation instruction is necessary;

when the delay condition is satisfied, perform delay processing that waits without issuing the operation instruction; and when a delay end condition is satisfied after start of the delay processing, issue the operation instruction.

A second disclosure further has the following feature in addition to the first disclosure.

After the start of the delay processing, the control device performs assist processing that controls travel of the vehicle such that the attention desire degree decreases.

A third disclosure further has the following feature in addition to the second disclosure.

The control device performs the assist processing when a situation where the delay condition is satisfied continues for a certain period of time after the start of the delay processing.

A fourth disclosure further has the following feature in addition to any one of the first to third disclosures.

The delay end condition is that the delay condition is not satisfied.

A fifth disclosure further has the following feature in addition to any one of the first to third disclosures.

The delay end condition is that a situation where the delay condition is satisfied continues for a certain period of time.

A sixth disclosure further has the following feature in addition to any one of the first to third disclosures.

The delay end condition is that a predetermined delay time passes since the start of the delay processing.

A seventh disclosure further has the following feature in addition to any one of the first to sixth disclosures.

When the operation instruction is an urgent one, the control device issues the operation instruction without performing the delay processing.

According to the present disclosure, if it is necessary to issue the operation instruction, the autonomous driving system checks whether or not the driver desires to pay attention to the surrounding situation. When the driver desires to pay attention to the surrounding situation, the autonomous driving system performs the delay processing that actively delays the issuance of the operation instruction. Due to the delay processing, the issuance timing of the operation instruction deviates from the timing when the driver desires to pay attention to the surrounding situation. This reduces the amount of information that the driver should handle simultaneously and the number of operations that the driver should perform simultaneously. As a result, the driver's senses of urgency and discomfort are suppressed. Moreover, it is easy for the driver having room to breathe to accurately perform the response operation. These contribute to a smooth vehicle travel and increase in confidence in the autonomous driving system.

EMBODIMENTS

Embodiments of the present disclosure will be described below with reference to the attached drawings.

1. Outline

Figure 1:
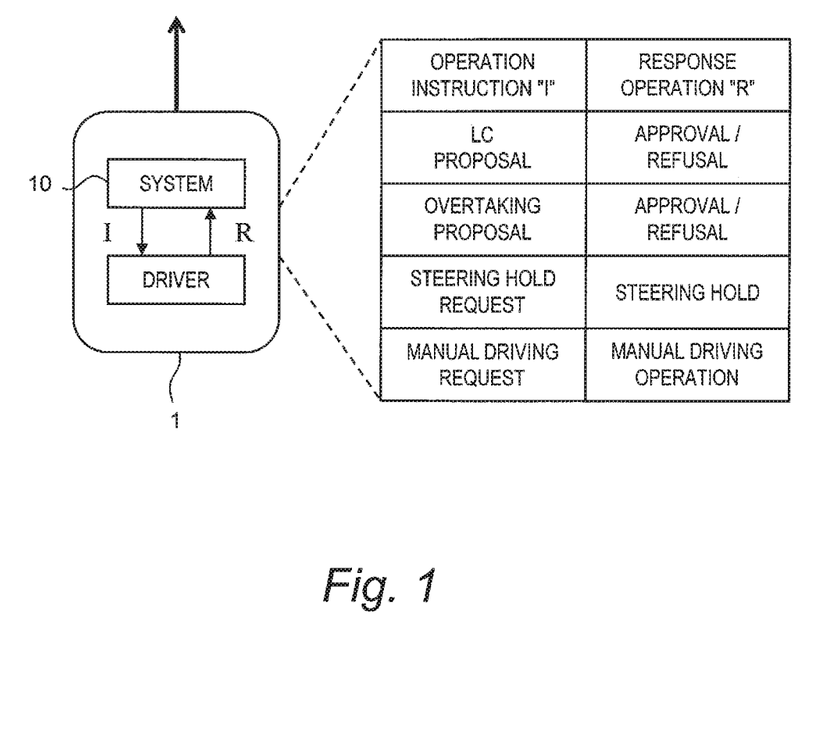
FIG. 1 is a conceptual diagram for explaining an autonomous driving system mounted on a vehicle according to an embodiment of the present disclosure.

FIG. 1 is a conceptual diagram for explaining an autonomous driving system 10 according to the present embodiment. The autonomous driving system 10 is mounted on a vehicle 1 and controls autonomous driving of the vehicle 1. In order to achieve a smooth vehicle travel, the autonomous driving system 10 sometimes issues an "operation instruction I" to a driver during the autonomous driving. The operation instruction I is an instruction that makes a request or a proposal to the driver and urges the driver to perform a "response operation R" responding to the request or the proposal.

Figure 2:
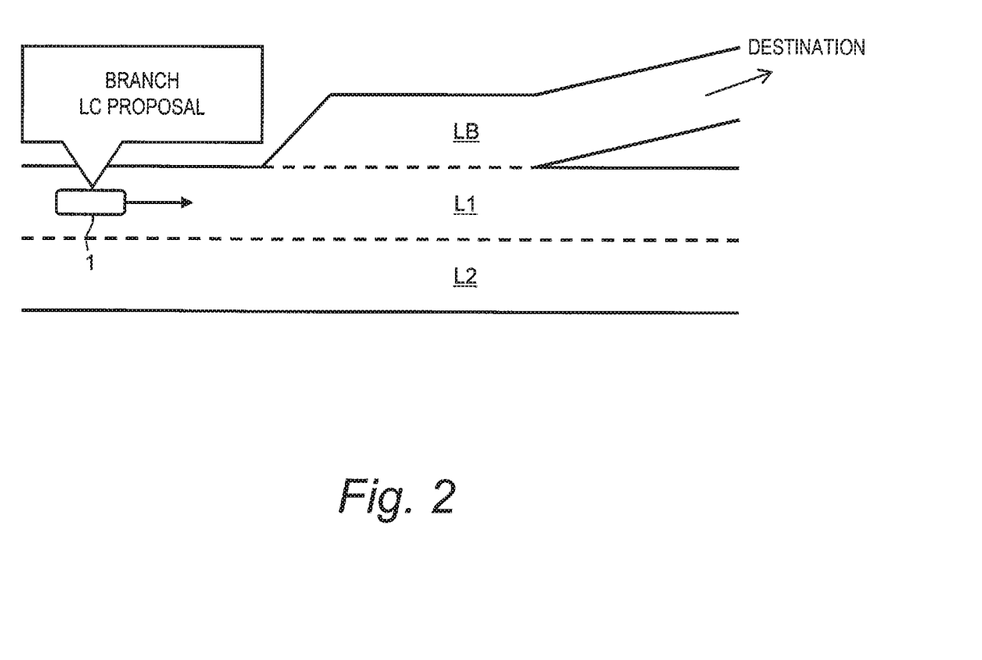
FIG. 2 is a conceptual diagram showing an example of a situation where an operation instruction is issued.

FIG. 2 shows an example of a situation where the operation instruction I is issued. The vehicle 1 is traveling in a lane L1. A branch lane LB branches off from the lane L1 ahead of the vehicle 1. Let us consider a case where the vehicle 1 needs to enter the branch lane LB in order to reach a destination. In this case, the autonomous driving system 10 plans a lane change (LC) from the lane L1 to the branch lane LB and proposes the lane change to the driver. In the situation where the lane change is proposed, the driver is required to approve or refuse the lane change proposal (hereinafter referred to as "LC proposal"). That is, the "LC proposal" is the operation instruction I, and the response operation R responding to the LC proposal is "approval/refusal". The same applies to a case of lane merging.

As another example, the autonomous driving system 10 proposes to overtake a preceding vehicle. This may also be considered as a kind of the LC proposal. In the situation where the overtaking is proposed, the driver is required to approve or refuse the overtaking proposal. That is, the "overtaking proposal" is the operation instruction I, and the response operation R responding to the overtaking proposal is "approval/refusal".

As still another example, the autonomous driving system 10 requests the driver to hold a steering wheel. Holding the steering wheel is hereinafter referred to as "steering hold". For example, when there is a sharp curve ahead of the vehicle 1 performing the autonomous driving, the autonomous driving system 10 requests the driver to perform the steering hold, in view of possibility of lane departure. The driver performs the steering hold in response to such the request. That is, the "steering hold request" is the operation instruction I, and the response operation R responding to the steering hold request is the "steering hold".

As still another example, the autonomous driving system 10 requests the driver to start manual driving. Examples of a situation requiring the manual driving are as follows: the vehicle 1 arrives near the destination; a zone where the autonomous driving is permitted ends; there is an event (e.g. roadwork section, complex terrain, etc.) that is hard to handle by the autonomous driving; and so forth. In the situation where the manual driving is requested, the driver performs a manual driving operation (e.g. the steering hold, a steering operation, an acceleration operation, a braking operation). That is, the "manual driving request" is the operation instruction I, and the response operation R responding to the manual driving request is the "manual driving operation".

In some cases, the autonomous driving system 10 issues the operation instruction I at a timing when the driver desires to pay attention to a surrounding situation. When the autonomous driving system 10 issues the operation instruction I, the driver needs to understand a content of the operation instruction I and further perform the response operation R. However, there is a limit to the amount of information and the number of operations that a human (driver) can handle simultaneously. Therefore, if the operation instruction I is issued at a timing when the driver desires to pay attention to the surrounding situation, the driver is likely to feel senses of urgency and discomfort.

Figure 3:
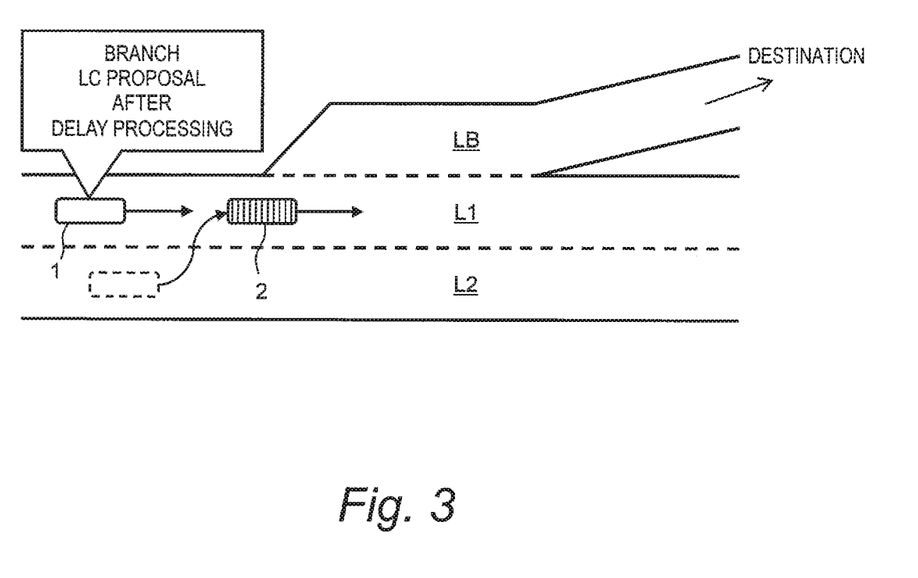
FIG. 3 is a conceptual diagram for explaining a feature of the embodiment of the present disclosure.

For example, let us consider a situation as shown in FIG. 3. As in the case of FIG. 2 described above, the autonomous driving system 10 plans a lane change from the lane L1 to the branch lane LB in order to reach the destination. At this timing, another vehicle 2 cuts in front of the vehicle 1 from a lane L2 adjacent to the lane L1. In this case, the driver desires to pay attention to a behavior of the cutting-in vehicle 2. If the autonomous driving system 10 makes the LC proposal at this timing, the information is too much to handle and the driver is likely to feel senses of urgency and discomfort.

As described above, if the operation instruction I is issued at a timing when the driver desires to pay attention to the surrounding situation, the driver is likely to feel senses of urgency and discomfort. It is also likely that the driver having no room to breathe cannot perform the response operation R accurately. These hinder a smooth vehicle travel and decrease confidence in the autonomous driving system 10.

In view of the above, if it is necessary to issue the operation instruction I, the autonomous driving system 10 according to the present embodiment checks whether or not the driver desires to pay attention to the surrounding situation. When the driver desires to pay attention to the surrounding situation, the autonomous driving system 10 performs "delay processing" that actively delays the issuance of the operation instruction I. Due to the delay processing, the issuance timing of the operation instruction I deviates from the timing when the driver desires to pay attention to the surrounding situation. This reduces the amount of information that the driver should handle simultaneously and the number of operations that the driver should perform simultaneously. As a result, the driver's senses of urgency and discomfort are suppressed. Moreover, it is easy for the driver having room to breathe to accurately perform the response operation R. These contribute to a smooth vehicle travel and increase in confidence in the autonomous driving system 10.

Hereinafter, a configuration of and processing by the autonomous driving system 10 according to the present embodiment will be described in more detail.

2. Configuration Example of Autonomous Driving System

Figure 4:
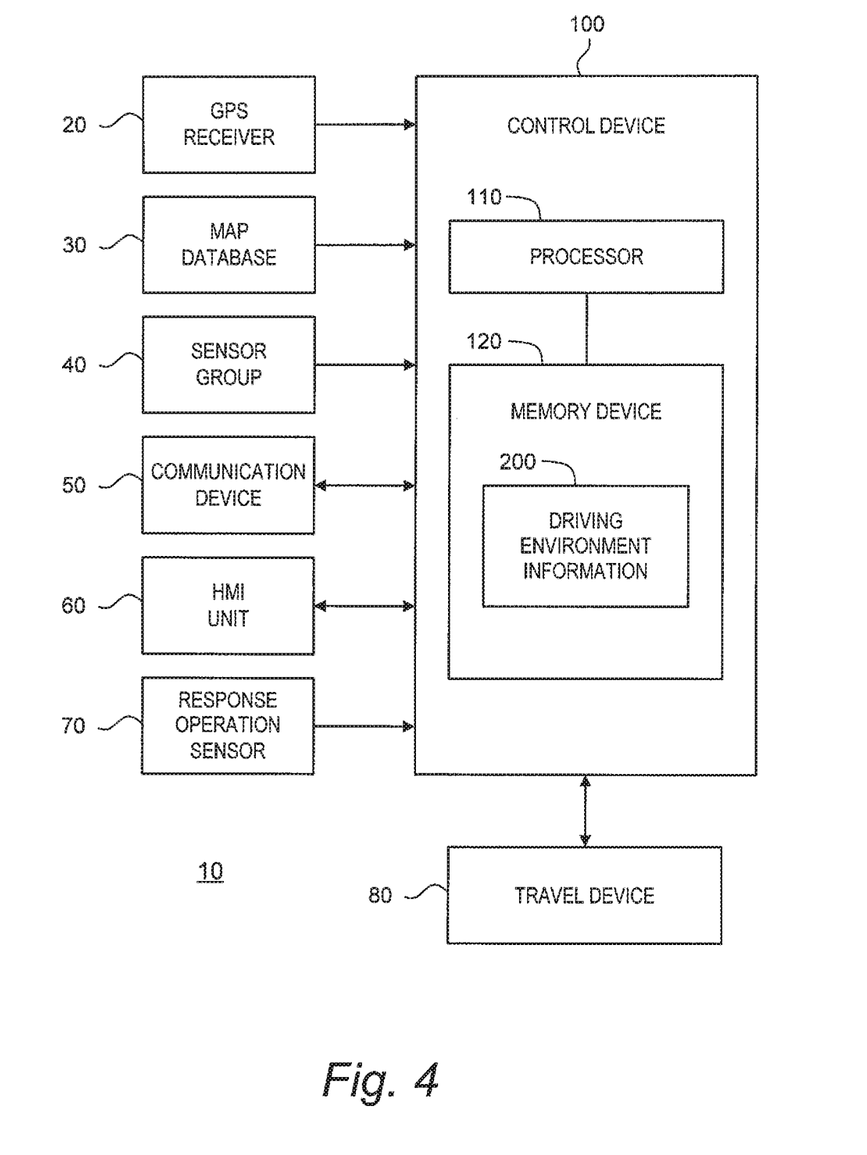
FIG. 4 is a block diagram showing a configuration example of the autonomous driving system according to the embodiment of the present disclosure.

FIG. 4 is a block diagram showing a configuration example of the autonomous driving system 10 according to the present embodiment. The autonomous driving system 10 is provided with a GPS (Global Positioning System) receiver 20, a map database 30, a sensor group 40, a communication device 50, an HMI (Human Machine Interface) unit 60, a response operation sensor 70, a travel device 80, and a control device 100.

The GPS receiver 20 receives signals transmitted from a plurality of GPS satellites and calculates a position and an orientation of the vehicle 1 based on the received signals.

Map information is recorded in the map database 30. The map information includes information of lane geometries, lane attributes, autonomous driving permitted zones, positions of facilities (a tollgate, for example), and the like.

The sensor group 40 detects a situation around the vehicle 1 and a state of the vehicle 1. The sensor group 40 is exemplified by a LIDAR (Laser Imaging Detection and Ranging), a radar, a camera, a vehicle speed sensor, and the like. The LIDAR uses laser lights to detect a target around the vehicle 1. The radar uses radio waves to detect a target around the vehicle 1. The camera images a situation around the vehicle 1. The vehicle speed sensor detects a speed of the vehicle 1.

The communication device 50 communicates with the outside of the vehicle 1. For example, the communication device 50 performs a V2I communication (a vehicle-to-infrastructure communication) with a surrounding infrastructure. The communication device 50 may perform a V2V communication (a vehicle-to-vehicle communication) with a surrounding vehicle. In addition, the communication device 50 may communicate with a management server managing autonomous driving service through a communication network.

The HMI unit 60 is an interface for proving the driver with information and receiving information from the driver. More specifically, the HMI unit 60 includes an input device and an output device. The input device is exemplified by a touch panel, a switch, a microphone, and the like. The output device is exemplified by a display device, a speaker, and the like. The output device is used for notification of the operation instruction I to the driver. The input device is used by the driver for inputting the response operation R (especially, approval/refusal).

The response operation R by the driver is not limited to approval/refusal. In some cases, the response operation R is the steering hold or the manual driving operation. The response operation sensor 70 includes a sensor for detecting the response operation R other than approval and refusal. For example, the response operation sensor 70 includes a steering wheel touch sensor for detecting whether or not the driver is holding the steering wheel. The response operation sensor 70 may include sensors for detecting the steering operation, the acceleration operation, and the braking operation, respectively.

The travel device 80 includes a steering device, a driving device, a braking device, and so forth. The steering device turns wheels. The driving device is a power source that generates a driving force. The driving device is exemplified by an engine and an electric motor. The braking device generates a braking force.

The control device 100 controls the autonomous driving of the vehicle 1. The control device 100 is a microcomputer including a processor 110 and a memory device 120. The control device 100 is also called an ECU (Electronic Control Unit). The autonomous driving control by the control device 100 is achieved by the processor 110 executing a control program stored in the memory device 120.

For example, the control device 100 acquires information necessary for the autonomous driving control. The information necessary for the autonomous driving control is information indicating driving environment for the vehicle 1, and the information is hereinafter referred to as "driving environment information 200". The driving environment information 200 is stored in the memory device 120, and read out and used as appropriate.

Figure 5:
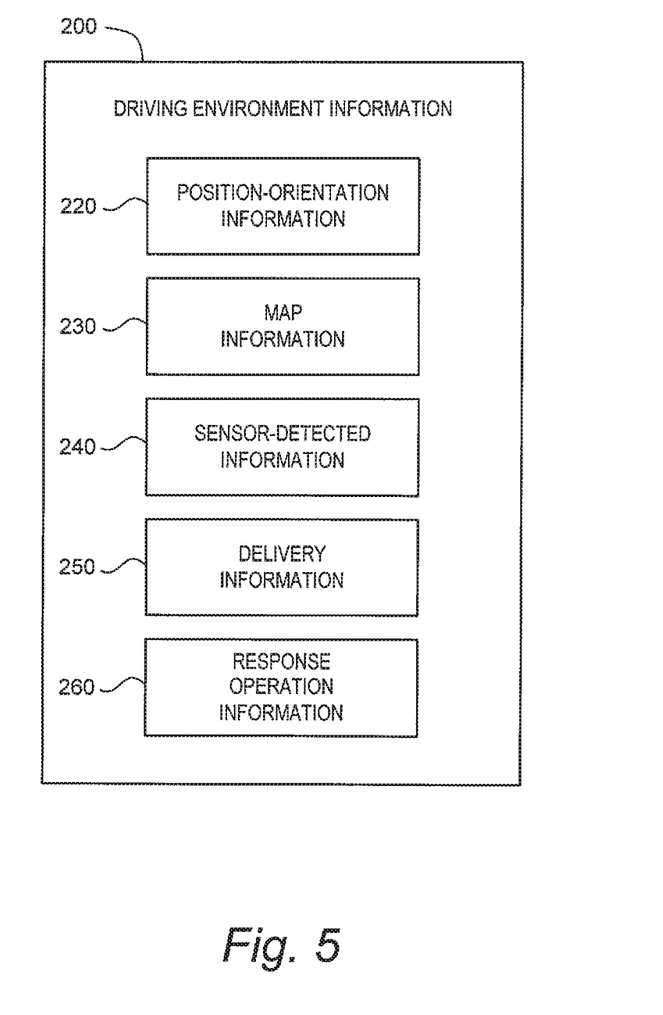
FIG. 5 is a block diagram showing an example of driving environment information used in the autonomous driving system according to the embodiment of the present disclosure.

FIG. 5 shows an example of the driving environment information 200 in the present embodiment. The driving environment information 200 includes position-orientation information 220, map information 230, sensor-detected information 240, delivery information 250, and response operation information 260.

The position-orientation information 220 indicates the position and the orientation of the vehicle 1. The control device 100 acquires the position-orientation information 220 from the GPS receiver 20.

The map information 230 includes information of lane geometries, lane attributes, autonomous driving permitted zones, positions of facilities (a tollgate, for example), and the like. The control device 100 acquires the map information 230 around the vehicle 1 based on the position-orientation information 220 and the map database 30. Based on the lane geometries and the lane attributes indicated by the map information 230, the control device 100 can recognize lane merging, lane branching, intersections, lane curvatures, and so forth.

The sensor-detected information 240 is information acquired based on a result of detection by the sensor group 40. More specifically, the sensor-detected information 240 includes target information regarding a target around the vehicle 1. The target around the vehicle 1 is exemplified by a surrounding vehicle, a fallen object, a white line, a roadside structure, a sign, and so forth. The target information includes a relative position, a relative speed, and the like of the detected target as seen from the vehicle 1. In addition, the sensor-detected information 240 includes the vehicle speed detected by the vehicle speed sensor. The control device 100 acquires the sensor-detected information 240 based on the result of detection by the sensor group 40.

The delivery information 250 is information acquired through the communication device 50. For example, the delivery information 250 includes road traffic information (traffic jam information, roadwork section information, accident information, traffic regulation information, and the like) delivered from the infrastructure. The delivery information 250 may include information delivered from the management server managing the autonomous driving service. The control device 100 acquires the delivery information 250 by using the communication device 50 to communicate with the outside of the vehicle 1.

The response operation information 260 is information indicating whether or not the response operation R is performed by the driver. For example, the control device 100 acquires the response operation information 260 regarding approval and refusal through the HMI unit 60. In addition, the control device 100 acquires the response operation information 260 regarding the response operation R other than approval and refusal from the response operation sensor 70.

It can be said that the GPS receiver 20, the map database 30, the sensor group 40, the communication device 50, the HMI unit 60, the response operation sensor 70, and the control device 100 constitute an "information acquisition device" that acquires the driving environment information 200.

The control device 100 controls the autonomous driving of the vehicle 1 based on the driving environment information 200. More specifically, the control device 100 creates a travel plan of the vehicle 1 based on the driving environment information 200. Then, the control device 100 controls the travel device 80 to make the vehicle 1 travel in accordance with the travel plan.

Furthermore, the control device 100 plans the operation instruction I as appropriate during the autonomous driving. Then, the control device 100 uses the HMI unit 60 to issue (notify) the operation instruction I to the driver. The driver performs the response operation R in response to the operation instruction I. The control device 100 determines, based on the response operation information 260, that the response operation R is performed by the driver. For example, when the operation instruction I is the LC proposal and the LC proposal is approved by the driver, the control device 100 controls the travel device 80 to execute the lane change.

3. Attention Event and Attention Desire Degree

Figure 6:
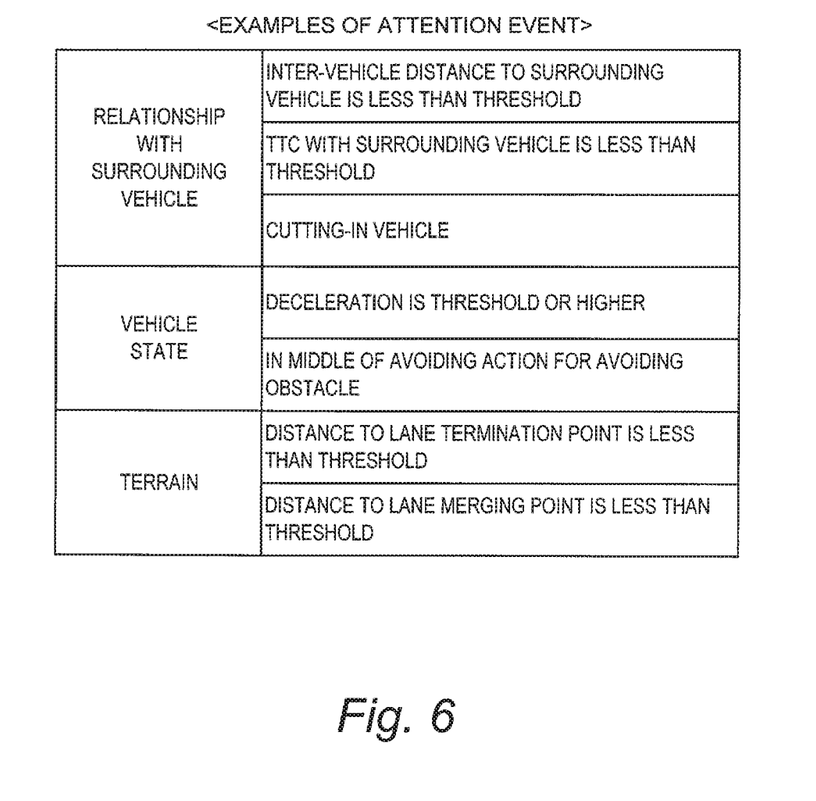
FIG. 6 is a diagram showing various examples of an attention event in the embodiment of the the present disclosure.

Processing that the control device 100 issues the operation instruction I is hereinafter referred to as "operation instruction issuance processing". In the operation instruction issuance processing, the control device 100 checks to see whether or not the driver desires to pay attention to a situation surrounding the vehicle 1. A degree of the driver's desire to pay attention to the situation surrounding the vehicle 1 is hereinafter referred to as an "attention desire degree W". For example, in a situation where a cutting-in vehicle exists as exemplified in FIG. 3, the attention desire degree W increases. Such an event that increases the attention desire degree W is hereinafter referred to as an "attention event". The attention event is recognized based on the driving environment information 200. Various examples as shown in FIG. 6 can be considered as the attention event.

Figure 7:
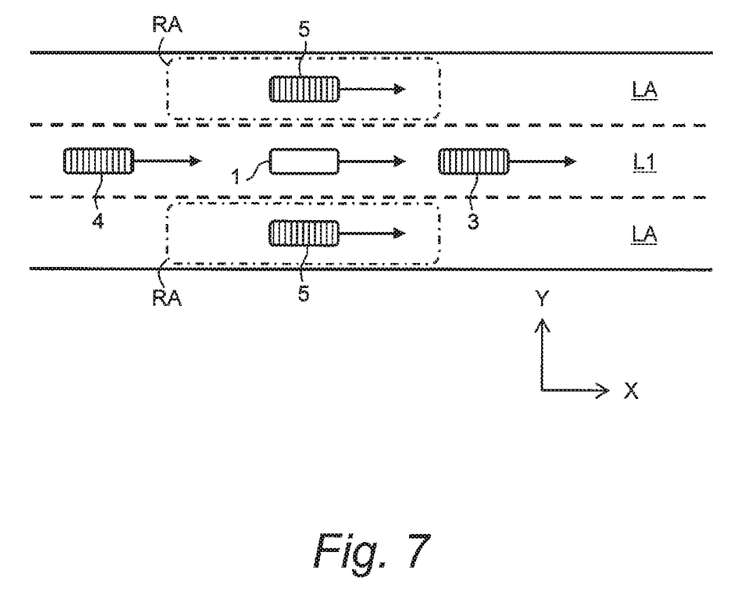
FIG. 7 is a conceptual diagram for explaining a surrounding vehicle.

A first example of the attention event is that "an inter-vehicle distance to a surrounding vehicle is less than a threshold". As shown in FIG. 7, the surrounding vehicle is exemplified by a preceding vehicle 3, a following vehicle 4, and an adjacent vehicle 5. The preceding vehicle 3 is a vehicle traveling ahead of the vehicle 1 in the same lane L1 as the vehicle 1. The following vehicle 4 is a vehicle traveling behind the vehicle 1 in the same lane L1 as the vehicle 1. The adjacent vehicle 5 is a vehicle existing in a range RA in an adjacent lane LA adjacent to the lane L1. The range RA is a range within a certain distance from the vehicle 1 in an X-direction (i.e. a longitudinal direction). For example, a distance in an Y-direction (i.e. a lateral direction) between the vehicle 1 and the adjacent vehicle 5 is defined as the inter-vehicle distance to the adjacent vehicle 5. The attention event according to the first example can be recognized based on the sensor-detected information 240.

A second example of the attention event is that "a TTC (Time-To-Collision) with the surrounding vehicle is less than a threshold". The TTC is calculated by dividing the inter-vehicle distance in the first example by the relative speed. The TTC in the case of the adjacent vehicle 5 is calculated by diving the distance in the Y-direction between the vehicle 1 and the adjacent vehicle 5 by the Y-direction component of the relative speed. The attention event according to the second example can be recognized based on the sensor-detected information 240.

Figure 8:
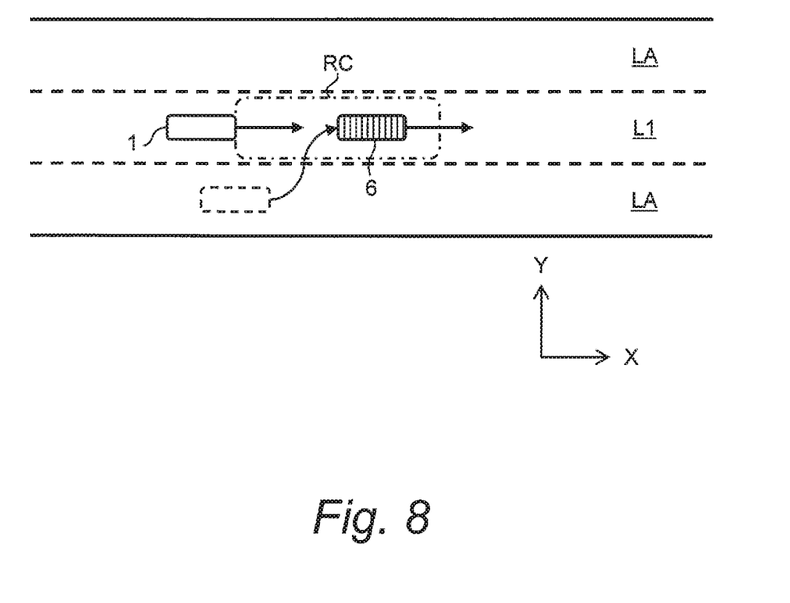
FIG. 8 is a conceptual diagram for explaining a cutting-in vehicle.

A third example of the attention event is a "cutting-in vehicle". FIG. 8 is a conceptual diagram for explaining a cutting-in vehicle 6. Let us consider a range RC within a certain distance ahead of the vehicle 1 in the lane L1. When another vehicle makes a lane change from the adjacent lane LA to the lane L1 to enter the range RC, said another vehicle is determined to be the cutting-in vehicle 6. In another example, when the adjacent vehicle 5 (see FIG. 7) traveling in the adjacent lane LA turns on a blinker indicating a direction of the lane L1 or starts moving towards the lane L1, the adjacent vehicle 5 may be determined to be the cutting-in vehicle 6. The attention event according to the third example can be recognized based on the sensor-detected information 240.

A fourth example of the attention event is that "a deceleration of the vehicle 1 is a threshold or higher". The attention event according to the fourth example can be recognized based on the sensor-detected information 240 (specifically, the vehicle speed).

A fifth example of the attention event is that "the vehicle 1 (the control device 100) is in middle of an avoiding action for avoiding an obstacle". The obstacle is exemplified by the preceding vehicle 3, a fallen object, a wall, and so forth. Such the obstacle is recognized based on the sensor-detected information 240 and the map information 230. The control device 100 judges the obstacle whose relative distance or TTC is less than a threshold as a target to be avoided. Then, the control device 100 controls the travel device 80 to perform avoiding action control (at least one of steering control and deceleration control) for avoiding the obstacle. The attention event according to the fifth example can be recognized based on control processes executed by the control device 100 itself.

A sixth example of the attention event is that "a distance from the vehicle 1 to a lane termination point is less than a threshold". In a situation where the lane L1 terminates ahead of the vehicle 1, a point where the lane L1 terminates is the lane termination point. The attention event according to the sixth example can be recognized based on the position-orientation information 220 and the map information 230.

A seventh example of the attention event is that "a distance from the vehicle 1 to a lane merging point is less than a threshold". In a situation where another lane merges into the lane L1 ahead of the vehicle 1, a point where said another lane and the lane L1 merge is the lane merging point. The attention event according to the seventh example can be recognized based on the position-orientation information 220 and the map information 230.

The attention desire degree W is calculated based on a result of the recognition of the attention event. In a simplest example, the attention desire degree W is represented by binary values. For example, when any of the above-described attention events exists, the attention desire degree W is set to a higher value "1". On the other hand, when no attention event exists, the attention desire degree W is set to a lower value "0".

As to a part of the attention events, the attention desire degree W can be represented by continuous values. For example, in the case of the attention event according to the first example, the attention desire degree W may be calculated to increase as the inter-vehicle distance to the surrounding vehicle becomes smaller than the threshold.

4. Flow Examples of Operation Instruction Issuance Processing

Hereinafter, examples of the operation instruction issuance processing by the control device 100 according to the present embodiment will be described.

4-1. First Example

Figure 9:
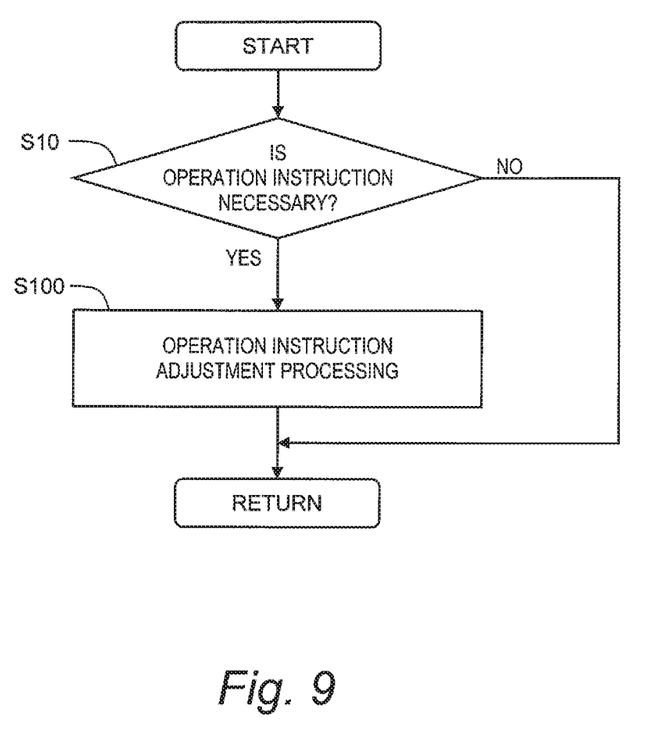
FIG. 9 is a flow chart showing a first example of operation instruction issuance processing according to the embodiment of the present disclosure.

FIG. 9 is a flow chart showing a first example of the operation instruction issuance processing. First, the control device 100 determines, based on the driving environment information 200, whether or not the operation instruction I is necessary (Step S10). More specifically, the control device 100 detects, based on the driving environment information 200, an event requiring the operation instruction I (hereinafter referred to as an "operation instruction event").

For example, the operation instruction event relating to the "LC proposal" includes lane branching, lane merging, and so forth. Such the operation instruction event is detectable based on the map information 230.

As another example, the operation instruction event relating to the "overtaking proposal" includes a low-speed preceding vehicle, and so forth. The low-speed preceding vehicle is detectable based on the sensor-detected information 240 (specifically, the target information and the vehicle speed information).

As still another example, the operation instruction event relating to the "steering hold request" includes a sharp curve existing ahead of the vehicle 1, and so forth. The sharp curve is detectable based on the map information 230 (specifically, the lane geometry information).

As still another example, the operation instruction event relating to the "manual driving request" includes a destination, a tollgate, an end point of an autonomous driving permitted zone, and so forth. Such the operation instruction event is detectable based on the map information 230. The operation instruction event relating to the "manual driving request" further includes an event that is hard to handle by the autonomous driving, such as a roadwork section, a congestion section, complex terrain, and so forth. The roadwork section and the congestion section can be recognized based on the delivery information 250. The complex terrain can be recognized based on the map information 230.

When there is any operation instruction event, the control device 100 determines that the operation instruction I is necessary (Step S10; Yes). In this case, the process proceeds to Step S100. Otherwise (Step S10; No), the process in the current cycle ends.

In Step S100, the control device 100 determines a type of the operation instruction I (see FIG. 1) to issue according to the detected operation instruction event. Then, the control device 100 issues the operation instruction I through the HMI unit 60. Here, the control device 100 performs the "delay processing" that actively delays the issuance of the operation instruction I, as appropriate. Processing of issuing the operation instruction I with performing the delay processing as appropriate is hereinafter referred to as "operation instruction adjustment processing".

Figure 10:
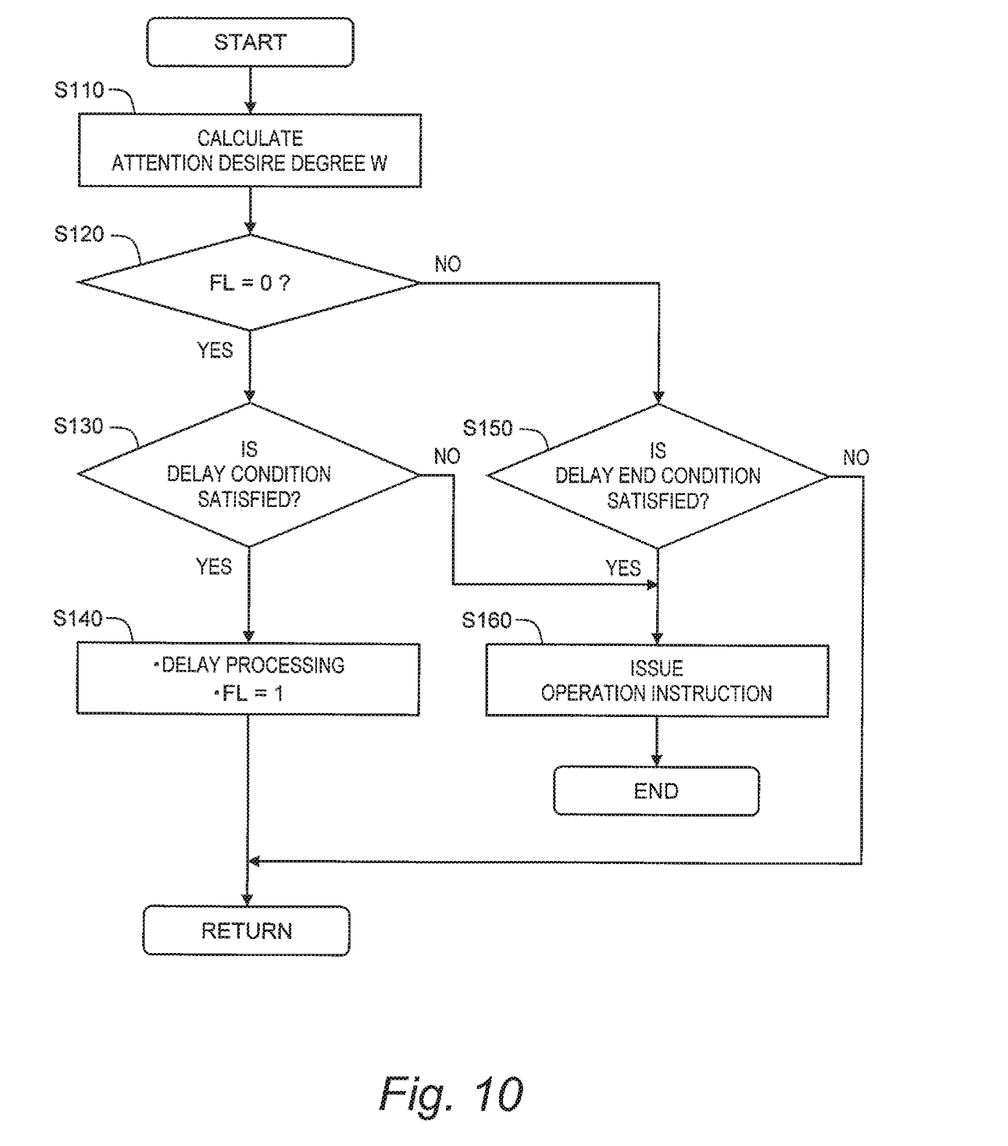
FIG. 10 is a flow chart showing operation instruction adjustment processing (Step S100) in FIG. 9.

FIG. 10 is a flow chart showing the operation instruction adjustment processing (Step S100). The flow shown in FIG. 10 is repeatedly executed every certain cycle.

In Step S110, the control device 100 determines, based on the driving environment information 200, whether or not there is any attention event described above to calculate the attention desire degree W described above.

In Step S120, the control device 100 checks whether a delay processing flag FL is "0" or "1". The delay processing flag FL is a flag indicating whether or not the delay processing is in execution, and its initial value is "0". When the delay processing flag FL is "0" (Step S120; Yes), the delay processing is not in execution and the process proceeds to Step S130. On the other hand, when the delay processing flag FL is "1" (Step S120; No), the delay processing is in execution and the process proceeds to Step S150.

In Step S130, the control device 100 determines whether or not to perform the delay processing. A condition for determining to perform the delay processing is hereinafter referred to as a "delay condition". The delay condition is that the attention event is determined to exist in the above-described Step S110 or the attention desire degree W calculated in the above-described Step S110 exceeds a threshold. For example, when the attention desire degree W is represented by binary values of "0" and "1" as exemplified above, the threshold is set to 0.5. When the delay condition is satisfied (Step S130; Yes), the process proceeds to Step S140. On the other hand, when the delay condition is not satisfied (Step S130; No), the process proceeds to Step S160.

In Step S140, the control device 100 performs (starts) the delay processing. That is, the control device 100 waits without issuing the operation instruction I. Moreover, the control device 100 sets the delay processing flag FL to "1". After that, the process in the current cycle ends.

In Step S150, the control device 100 determines whether a "delay end condition" for terminating the delay processing is satisfied or not. Various examples can be considered as the delay end condition.

An example of the delay end condition is that "the delay condition is not satisfied". That is, the delay end condition is satisfied when there is no attention event in Step S110 and the attention desire degree W is equal to or less than the threshold.

Another example of the delay end condition is that "a situation where the delay condition is satisfied continues for a certain period of time". For example, in a case of a traffic jam, a situation where the delay condition is satisfied lasts for a long period of time. Terminating the delay processing after a certain period of time can prevent the issuance of the operation instruction I from being delayed unnecessarily. Moreover, the driver is considered to get used to the attention event after the situation where the delay condition is satisfied continues for a certain period of time. After the driver gets used to the attention event, the issuance of the operation instruction I does not cause the driver to feel the sense of urgency.

Still another example of the delay end condition is that "a predetermined delay time passes since the start of the delay processing". The predetermined delay time is beforehand registered in the memory device 120 of the control device 100. The attention event is expected to disappear after a certain period of time passes since the start of the delay processing. Even if the attention event still remains, the driver is considered to already get used to the attention event. After the driver gets used to the attention event, the issuance of the operation instruction I does not cause the driver to feel the sense of urgency.

When the delay end condition is satisfied (Step S150; Yes), the process proceeds to Step S160. Otherwise (Step S150; No), the process in the current cycle ends.

In Step S160, the control device 100 terminates the delay processing and issues the operation instruction I. That is, when the delay condition is never satisfied from the beginning (Step S130; No) or when the delay end condition is satisfied after the start of the delay processing (Step S150; Yes), the control device 100 issues the operation instruction I. Then, the operation instruction adjustment processing (Step S100) ends.

4-2. Second Example

Figure 11:
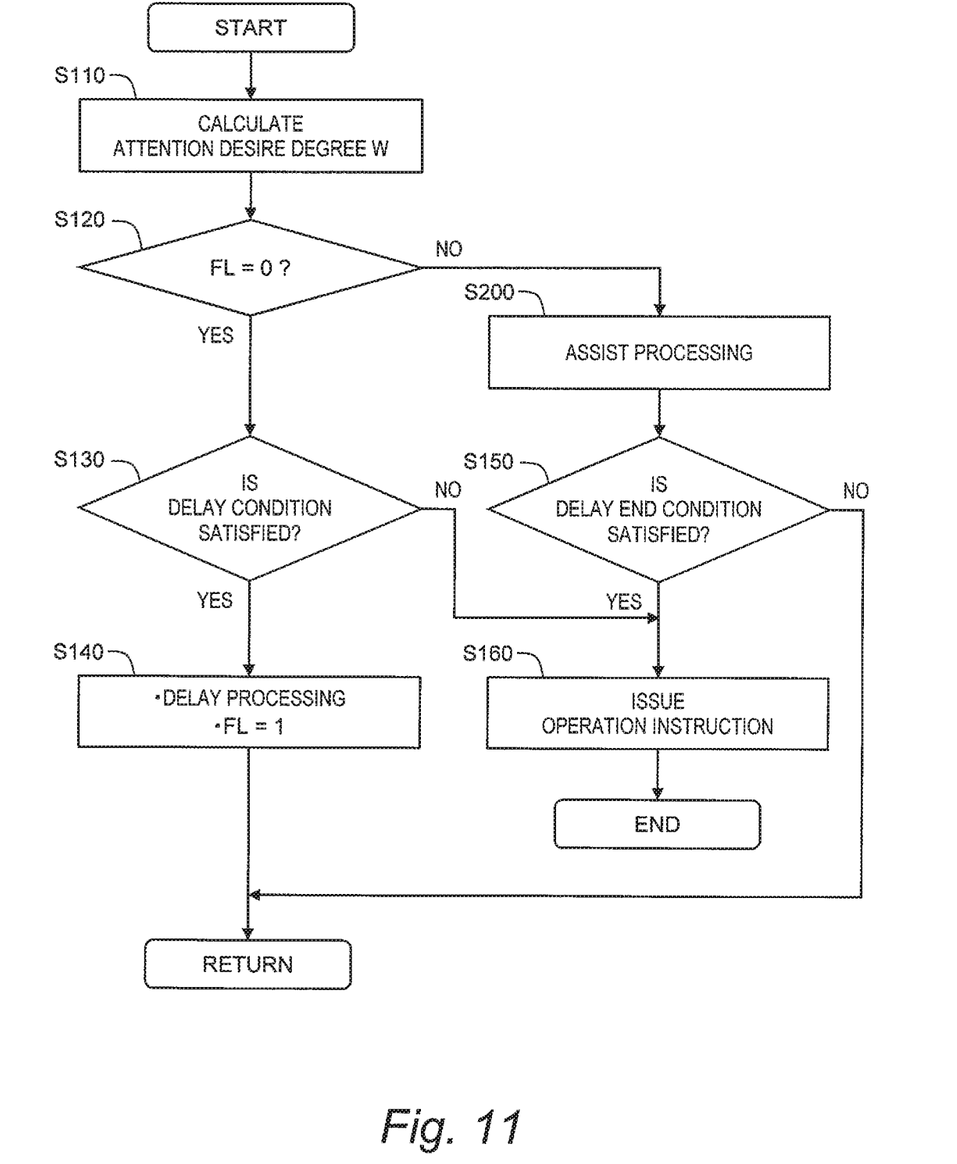
FIG. 11 is a flow chart showing the operation instruction adjustment processing (Step S100) in a second example of the operation instruction issuance processing according to the embodiment of the present disclosure.

FIG. 11 is a flow chart showing a second example of the operation instruction issuance processing, especially the operation instruction adjustment processing (Step S100). Overlapping descriptions with the first example shown in FIG. 10 will be omitted as appropriate.

According to the second example, the control device 100 performs "assist processing" (Step S200) after the start of the delay processing. The assist processing includes vehicle travel control that controls travel of the vehicle 1 such that the attention desire degree W decreases. The control device 100 controls the travel device 80 to perform the assist processing such that the attention desire degree W decreases.

As an example, let us consider a case where the attention event causing the delay processing is that "the inter-vehicle distance to the preceding vehicle 3 is less than the threshold". The assist processing in this case is "decelerating". Decelerating the vehicle 1 makes it possible to increase the inter-vehicle distance to the preceding vehicle 3 and thus to decrease the attention desire degree W.

As another example, let us consider a case where the attention event causing the delay processing is that "the inter-vehicle distance to the adjacent vehicle 5 is less than the threshold". The assist processing in this case is "steering in a direction away from the adjacent vehicle 5" or "decelerating". Moving the vehicle 1 away from the adjacent vehicle 5 makes it possible to decrease the attention desire degree W.

As still another example, let us consider a case where the attention event causing the delay processing is "the cutting-in vehicle 6". The assist processing in this case is "decelerating". Decelerating the vehicle 1 makes it possible to increase the inter-vehicle distance to the cutting-in vehicle 6 and thus to decrease the attention desire degree W.

As seen from the above, performing the assist processing after the start of the delay processing is able to make the attention event disappear early. As a result, it becomes easier to issue the operation instruction I.

It should be noted that the assist processing is not necessarily performed immediately after the start of the delay processing. The reason is that in some cases the attention event automatically disappears even if the assist processing is not performed. The control device 100 may perform the assist processing when a situation where the delay condition is satisfied continues for a certain period of time after the start of the delay processing. In this case, it is possible to avoid unnecessary decelerating and steering.

4-3. Third Example

Figure 12:
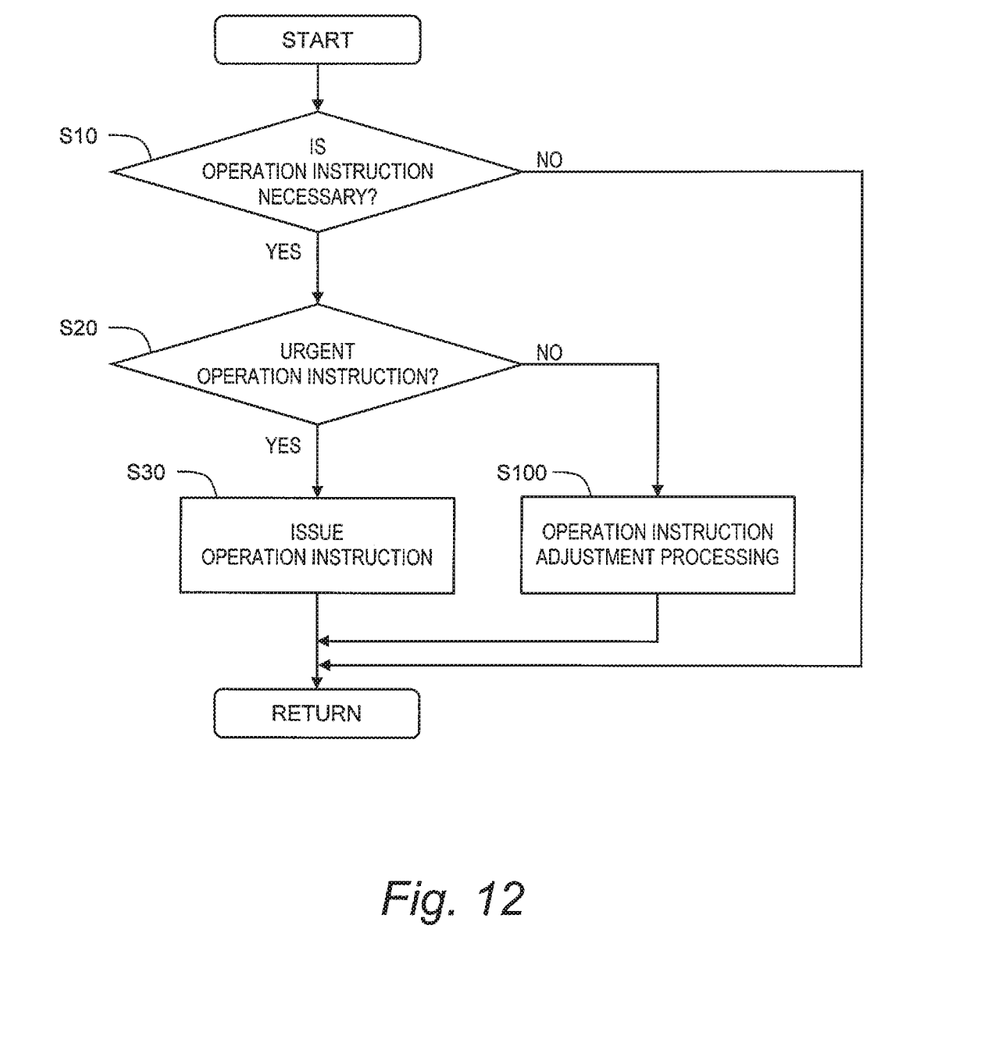
FIG. 12 is a flow chart showing a third example of the operation instruction issuance processing according to the embodiment of the present disclosure.

In a third example, let us consider a case where the necessary operation instruction I is urgent. For example, when an emergency vehicle is approaching, the control device 100 issues the manual driving request as an urgent operation instruction I. When the operation instruction I is an urgent one, the control device 100 immediately issues the operation instruction I without performing the delay processing.

FIG. 12 is a flow chart showing a third example of the operation instruction issuance processing. Overlapping descriptions with the first example will be omitted as appropriate. When the operation instruction I is necessary (Step S10; Yes), the control device 100 determines whether or not the operation instruction I is an urgent one (Step S20). A list of urgent operation instructions I is beforehand created and registered in the memory device 120 of the control device 100. When the operation instruction I is not an urgent one (Step S20; No), the process proceeds to the above-described Step S100 (see FIGS. 10 and 11). On the other hand, when the operation instruction I is an urgent one (Step S20; Yes), the control device 100 immediately issues the operation instruction I without performing the delay processing (Step S30).

According to the third example, it is possible to proceed flexibly depending on whether the operation instruction I is an urgent one or not.

What is claimed is:

1. An autonomous driving system mounted on a vehicle and comprising:
  a processor programmed to:
   acquire driving environment information indicating a driving environment for the vehicle;
   control autonomous driving of the vehicle based on the driving environment information; and
   issue an operation instruction to a driver of the vehicle during autonomous driving,
   the operation instruction being a request or proposal to the driver to perform a response operation,
  wherein:
   an attention desire degree is a degree of the driver's desire to pay attention to a situation surrounding the vehicle;
   an attention event is an event that increases the attention desire degree and is recognized based on the driving environment information;
   a delay condition occurs when the attention desire degree exceeds a threshold or when the attention event occurs;
   the operation instruction is a proposal to change lanes, a proposal to overtake another vehicle, a request to hold a steering wheel, or a request to start manual driving where each request or proposal is issued to the driver at different times;
   the response operation includes approving or refusing the operation instruction presented to the driver; and
   the processor is further programmed to:
    determine, based on the driving environment information, whether or not it is necessary to issue the operation instruction to the driver;

determine, based on the driving environment information, whether or not the delay condition is satisfied;

when it is necessary to issue the operation instruction to the driver and when the delay condition is satisfied, perform a delay process that postpones issuing the operation instruction to enable the driver to pay attention to the surrounding situation;

when a delay end condition is satisfied after starting the delay process, issue the operation instruction; and when it is necessary to issue the operation instruction to the driver and when the delay condition is not satisfied, issue the operation instruction to the driver without performing the delay process.

2. The autonomous driving system according to claim 1, wherein after starting the delay process, the processor performs an assist process that controls travel of the vehicle such that the attention desire degree decreases.

3. The autonomous driving system according to claim 2, wherein the processor performs the assist process when the delay condition is satisfied and continues for a certain period of time after starting the delay process.

4. The autonomous driving system according to claim 1, wherein the delay end condition occurs when the delay condition is not satisfied.

5. The autonomous driving system according to claim 1, wherein the delay end condition occurs when the delay condition continues for a certain period of time.

6. The autonomous driving system according to claim 1, wherein the delay end condition occurs when a predetermined delay time passes after starting the delay process.

7. The autonomous driving system according to claim 1, wherein when the operation instruction is urgent, the processor issues the operation instruction without performing the delay process.

* * * * *